Sept. 24, 1963    F. M. POTTER    3,104,901
ARRANGEMENT OF QUICK ATTACH-DETACH MOUNTING
Filed Aug. 2, 1960    3 Sheets-Sheet 2
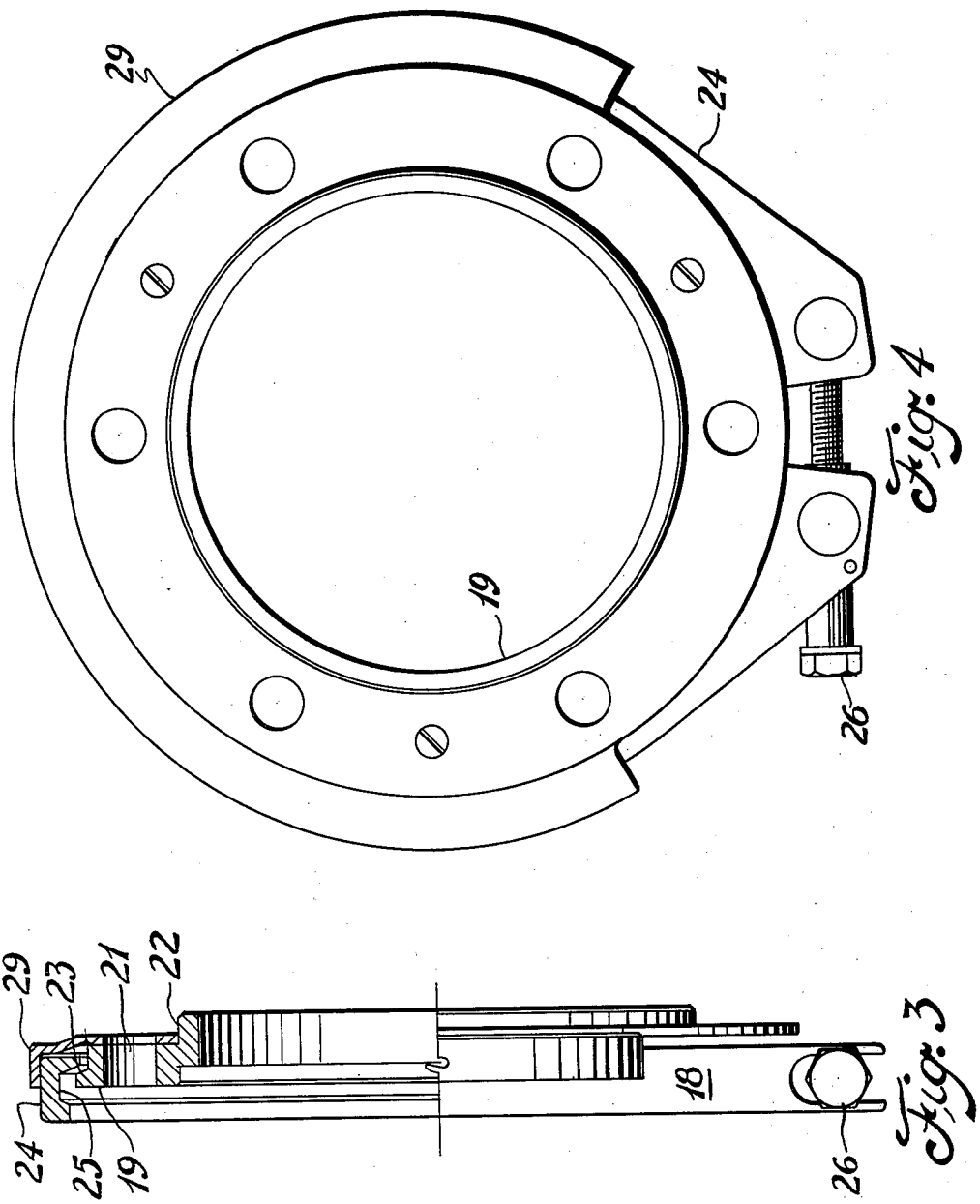
INVENTOR.
FREDERICK M. POTTER
BY
ATTORNEY Sept. 24, 1963　　　F. M. POTTER　　　3,104,901
ARRANGEMENT OF QUICK ATTACH-DETACH MOUNTING
Filed Aug. 2, 1960　　　3 Sheets-Sheet 3
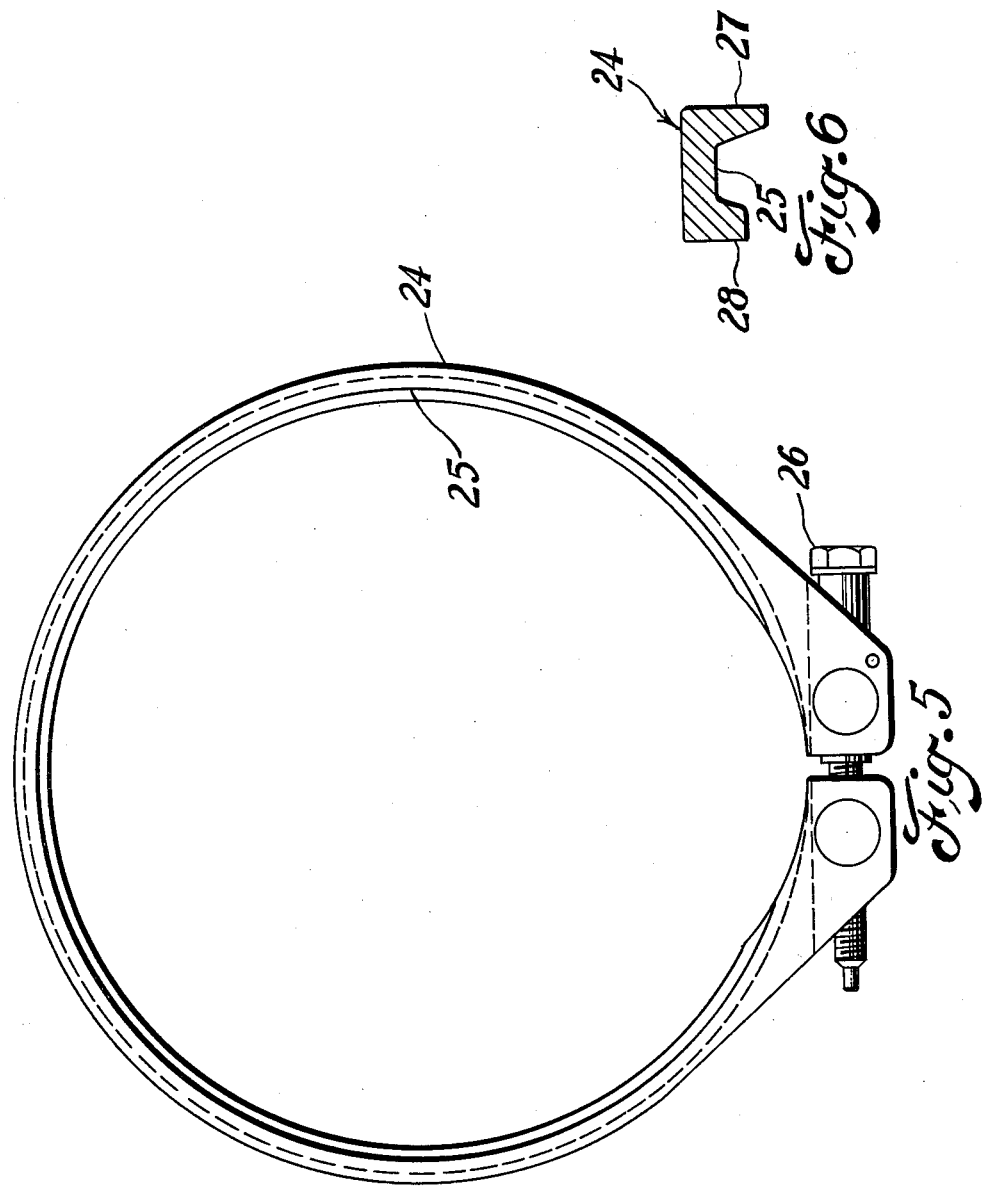
INVENTOR.
FREDERICK M. POTTER
BY
James M Mickels
ATTORNEY United States Patent Office 3,104,901
Patented Sept. 24, 1963

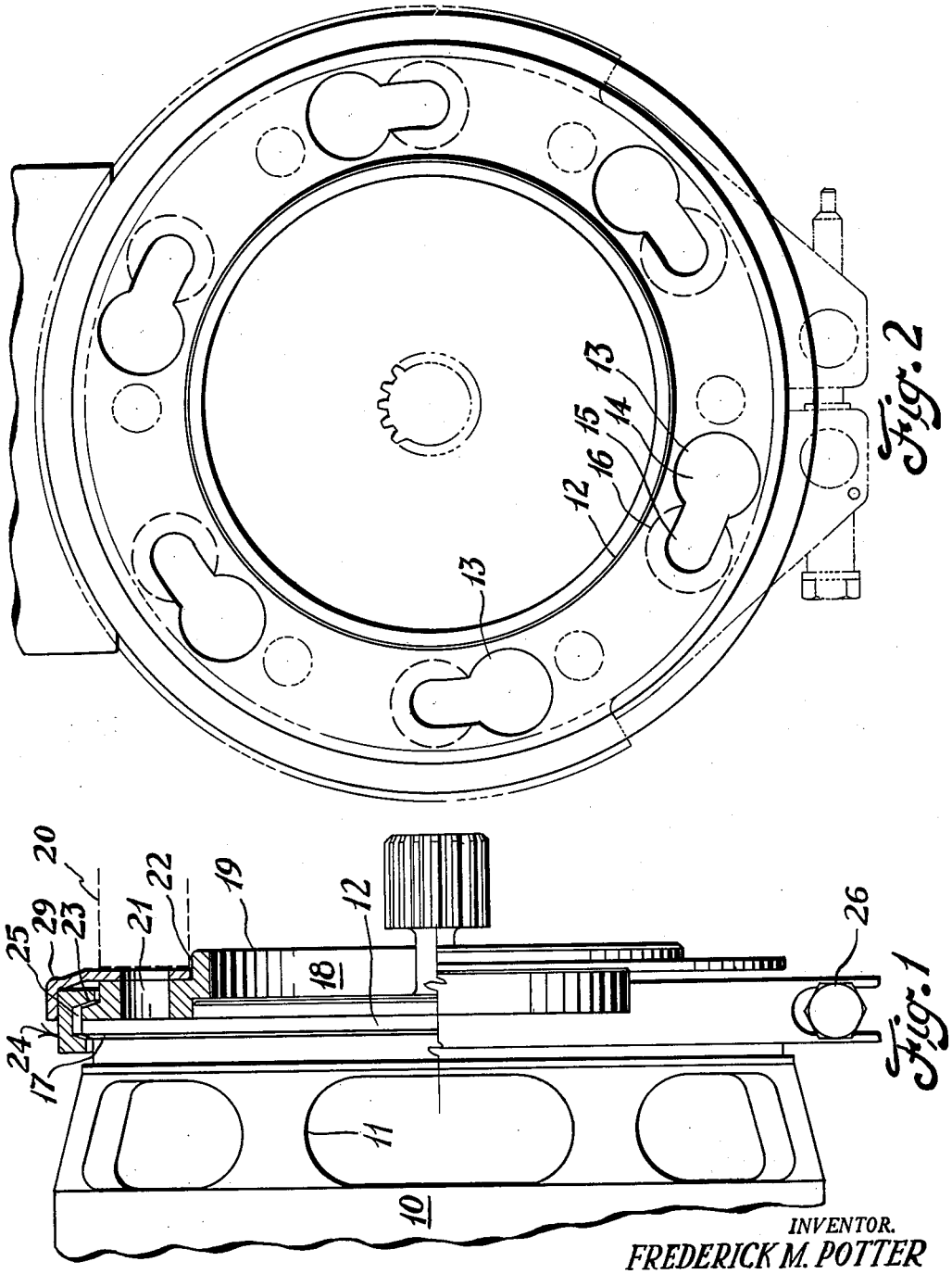

3,104,901
ARRANGEMENT OF QUICK ATTACH-DETACH MOUNTING
Frederick Milton Potter, Little Silver, N.J., assignor to The Bendix Corporation, Eatontown, N.J., a corporation of Delaware
Filed Aug. 2, 1960, Ser. No. 47,102
4 Claims. (Cl. 287—130)

The present invention relates to quick attach-disconnect means and more particularly to quick attach-disconnect means for attaching a dynamoelectric machine to an engine drive pad.

Heretofore quick attach-disconnect means, known as QAD, have required a special head on the dynamoelectric machine which would limit its use to the QAD or else would require a special mounting plate which would increase the overall length of the generator. Often space would not permit this increased length. A further disadvantage was the increase in the overhang moment.

The present invention provides a quick attach-detach mounting which can be adapted to a conventional or standard mounting flange of a dynamoelectric machine so that the machine can be used either with its standard flange or with this quick attach-detach flange. It is particularly adapted for use with a machine in which the standard mounting flange is provided with keyhole type of mounting holes which has become a standard practice. This type of mounting hole provides room for the nuts which hold the adapter plate to the engine drive pad. Without keyholes, additional length in the adapter would be required to clear the nuts.

It is an object of the invention to provide improved quick attach-detach means.

Another object of the invention is to provide a QAD for a generator having a standard mounting flange.

Another object of the invention is to provide a mounting arrangement for a dynamoelectric machine that is easy to manufacture and use.

Another object of the invention is to provide an improved arrangement of a quick attach-detach mounting.

The above and other objects and features of the invention will appear more fully hereinafter from a consideration of the following description taken in connection with the accompanying drawings, wherein one embodiment is illustrated by way of example.

In the drawings:

FIGURE 1 is a perspective view of a portion of a dynamoelectric machine having a quick attach-disconnect mounting in accordance with the invention.

FIGURE 2 is an end view of the dynamoelectric machine of FIGURE 1.

FIGURE 3 is a partial cutaway view of a quick attach-disconnect mounting embodying the invention.

FIGURE 4 is an end view of the mounting of FIGURE 3.

FIGURE 5 illustrates the clamping ring of the mounting.

FIGURE 6 is a sectional view of the ring of FIGURE 5.

Referring now to the drawings, wherein similar parts in the various figures have been assigned the same reference numerals, a dynamoelectric machine is indicated generally by the numeral 10 and may be of the type used in aircraft as a generator. The machine 10 has a mounting head 11 terminating in a flange 12. The flange 12 has a plurality of keyhole type mounting holes 13 which have an enlarged section 14 and smaller section 15. The underside of the section 15 is provided with a counter bore 16 shown by dashed lines. The head 11 has a tapered section 17 adjacent to the flange 12 which extends around the periphery thereof.

A mounting flange assembly 18 (also see FIGURES 3 and 4) has a mounting plate 19 adapted to be fastened to an engine drive pad 20 by means of bolts (not shown) extending through holes 21. The plate 19 has a shoulder portion 22 which serves as a pilot for mounting on the drive pad 20. The plate 19 terminates in a tapered section 23 extending around the periphery thereof.

A clamping ring 24 having a V-shaped channel 25 around the inner periphery thereof (see FIGURES 5 and 6) is adapted to coact with the tapered section 17 of the machine 10 and the tapered section 23 of the mounting flange 18 to clamp the parts together upon screw 26 of the ring 24 being tightened. In order to maintain the ring 24 on the adapter plate 19, one leg 27 of the channel 25 is longer than the other leg 28. Also a retaining clamp 29 is provided to limit the opening of the ring 24. The retaining clamp 29 is secured to the plate 19 by screws or other conventional means and extends only a portion of the way around the plate 19 in order to allow room for the screw 26 of the ring 24.

In operation, the machine 10 may be mounted in a conventional manner upon the engine pad by means of bolts from the pad extending through the mounting holes 13. If it is desired to utilize the QAD mounting, the mounting flange assembly 18 is secured to the engine pad by means of the bolts normally used to attach a machine thereto. The generator or machine is then positioned and the clamping ring 24 tightened to cause the V-channel 25 to coact with the tapered sections 17 and 23 to clamp the machine 10 firmly to the drive pad. In order to remove the machine, it is only necessary to loosen the clamp ring and withdraw it from the assembly. The long leg 27 and the retaining clamp 29 holds the clamp ring 24 on the plate 19 thus having it available for the next installation.

In order to utilize the aforenoted arrangement with a generator not having keyhole type mounting holes, it would be necessary for the holes 21 in the plate 19 to have a counter bore sufficient to clear the nuts which hold the plate 19 to the mounting pad. With the keyhole type mounting holes, there is sufficient clearance in the enlarged section.

Although only one embodiment of the invention has been illustrated and described, various changes in the form and relative arrangement of the parts, which will now appear to those skilled in the art, may be made without departing from the scope of the invention.

What is claimed is:

1. A quick attach-detach mounting for a dynamoelectric machine comprising a mounting flange integral with said dynamoelectric machine, a plurality of keyhole type mounting holes in said flange, a circumferential tapered section extending around said flange, a mounting plate adapted to be secured to an engine drive pad by bolts, a tapered flange extending around the circumference of said plate, and clamping means for coacting with said tapered section on said mounting flange and said tapered flange on said mounting plate to hold said dynamoelectric machine in position, said keyhole type holes providing clearance for said bolts.

2. A quick attach-detach mounting for a dynamoelectric machine having a circumferential tapered section around the mounting flange thereof, comprising a mounting plate, means for securing said mounting plate to an engine member, said plate having a shoulder for positioning said plate on said engine member, a circumferential flange extending around the periphery of said plate and having a taper on the side thereof adjacent to said engine member, a resilient clamping ring for coacting with said circumferential tapered section and said circumferential flange to secure said dynamoelectric machine to said mounting plate, and means including openings in said mounting flange to provide clearance for said securing means.

3. The combination as set forth in claim 2 and including means for retaining said clamping ring on said mounting plate and limiting the expansion thereof.

4. The combination as set forth in claim 2 in which said clamping ring has a V-shaped groove around the inner periphery thereof with one leg of the V being longer than the other.

References Cited in the file of this patent

UNITED STATES PATENTS

| | | |
|---|---|---|
| 2,693,380 | Flanagan | Nov. 2, 1954 |
| 2,803,474 | Wilson | Aug. 20, 1957 |